June 20, 1933. H. J. WOOCK ET AL 1,914,474
TREAD PRESSING MEANS FOR TIRE RETREADING MOLDS
Filed Aug. 20, 1928

INVENTORS
H. J. Woock, C. J. Peterson and
J. S. Caufield
BY [signature]
ATTORNEY Patented June 20, 1933

1,914,474

UNITED STATES PATENT OFFICE

HERBERT J. WOOCK, OF LODI, AND CHARLES J. PETERSON AND JACOB S. CAUFIELD, OF SACRAMENTO, CALIFORNIA, ASSIGNORS, BY MESNE ASSIGNMENTS, TO SUPER MOULD CORPORATION, OF RENO, NEVADA, A CORPORATION OF NEVADA

TREAD PRESSING MEANS FOR TIRE RETREADING MOLDS

Application filed August 20, 1928. Serial No. 300,859.

This invention relates to tire retreading molds and particularly represents modifications and improvements over the structures shown in Patent No. 1,662,035, dated March 6, 1928, to Messrs. Smith, Caufield and Peterson, and the co-pending application of the same inventors filed April 14, 1927, under Serial No. 183,742.

In both these previous devices the tread of the tire to be vulcanized was forced into firm engagement with the matrix of the mold by means of presser rings or plates disposed against the outside of the tire inwardly of the tread portion, and which when advanced toward each other against the resistance of the pressure offered by the inflated tire, caused the tread portion of the latter to be forced outwardly against the matrix.

With tires of certain sizes and tread shapes, however, we have found that while the rings effectively pressed the central portion of the tread against the matrix, the side portion of the tread sometimes did not engage the matrix with pressure sufficient to provide the necessary adhesion between the parts during the vulcanizing operations.

The principal object of the present invention therefore is to provide a simple and efficient means, acting in conjunction with the side presser rings, whereby the entire tread portion of the tire will be properly pressed in to firm engagement with the matrix.

The above object we accomplish by means of such structure and relative arrangement of parts as will fully appear by a perusal of the following specification and claim.

In the drawing similar characters of reference indicate corresponding parts in the several views.

Figures 1, 2, 3:
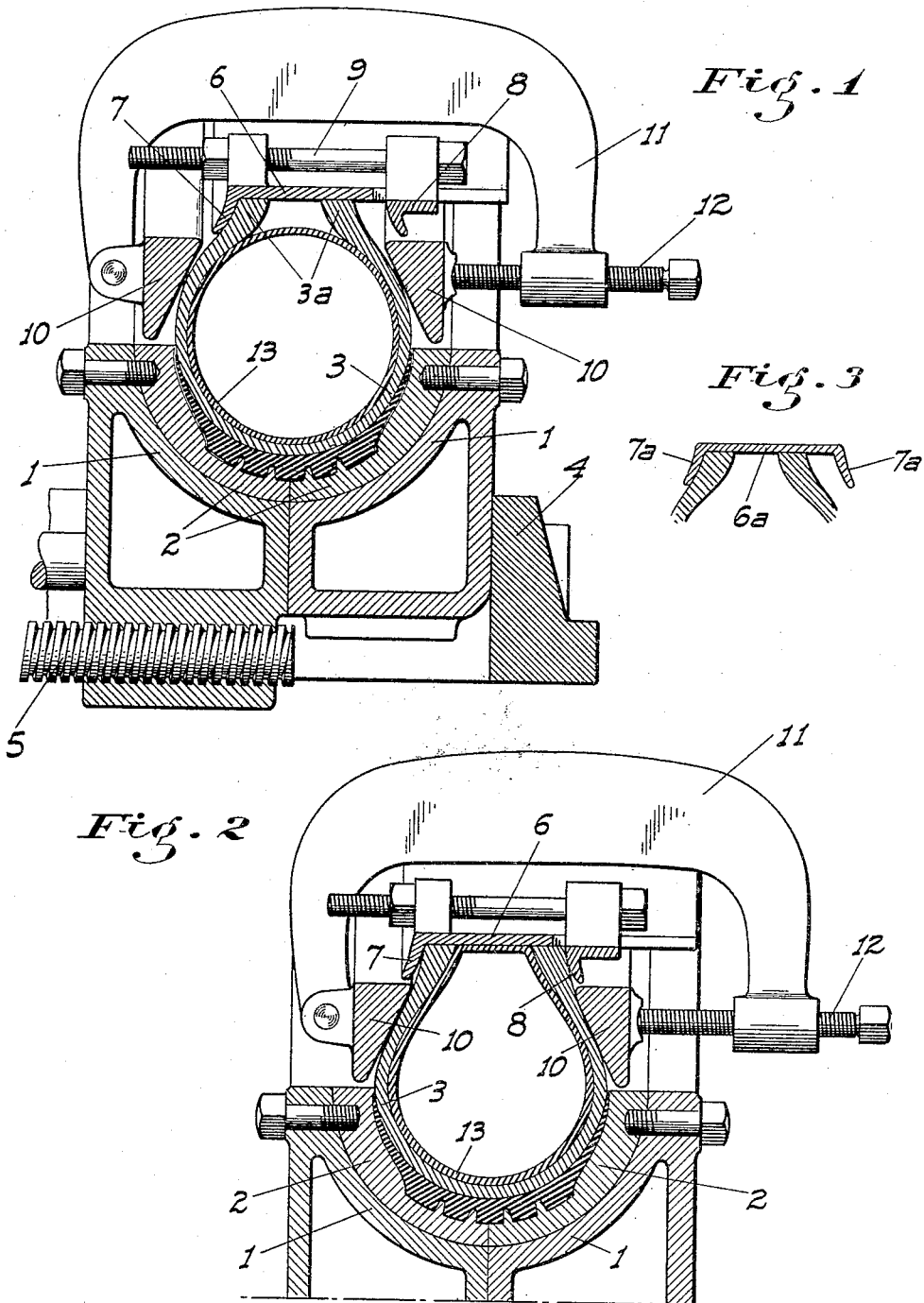
Fig. 1 is a sectional elevation of the mold equipped with our improved tread pressing mechanism showing the tire in position before the tire is inflated and the presser rings advanced against the tire.
Fig. 2 is a similar view showing the tire inflated and the rings pressed against the same.
Fig. 3 is a fragmentary section of a modified form of tire supporting rim.

Referring now more particularly to the characters of reference on the drawing, the numeral 1 denotes a pair of mold sections, in which matched matrix members 2 are detachably mounted, the matrix and mold sections extending substantially to the plane of the center of the cross sectional area of the tire 3 to be retreaded. One mold section is secured to the supporting frame 4 while the other is engaged by a horizontal screw 5 by means of which said section is moved to and from the fixed section as shown in said above-mentioned co-pending application.

The beads 3—a of the tire fit snugly on a band of a special rim 6 which is supported only by the tire and consequently is movable laterally relative to the mold. One side flange 7 of the rim is integral or permanently rigid therewith; while the other flange 8 is slidable transversely on the rim-band, which is much wider than usual. This movable flange is held in any position relative to the flange 7 by adjustable bolts 9 such as are shown in our co-pending application for patent, Serial No. 300,558, filed August 20, 1928, or other suitable means.

Facing the sides of the tire and disposed between the inner periphery of the matrix and the rim are opposed annular rings 10, connected by yokes 11 which include adjustable screws 12 engaging one ring for advancing or retracting the same relative to the other ring.

In operation, the tire to be retreaded is first mounted on the rim 6, with a deflated air bag 13 therein, and is then placed in the mold after first spreading the sections thereof apart to receive the tire, the presser rings at this time being retracted from the tire as shown in Fig. 1. The movable rim flange 8 is then moved outwardly a certain distance from the position naturally occupied by the adjacent bead when the tire is deflated and the other bead is engaged with the fixed flange. The air bag is then inflated to a certain pressure, which causes the disengaged bead to move laterally away from the other bead until it fetches up against the flange 8 as shown in Fig. 2. Since owing to the restraining influence of the base of the rim and the natural form of the tire the beads cannot move inwardly while being shifted transversely, the result is that the tread portion, and particularly the side parts thereof, is shifted laterally so that said parts are forced into firm engagement with the corresponding portions of the matrix. In other words, the natural somewhat circular horseshoe shape of the tire is altered and distorted so that it is wider than normally at its separated ends as well as at its center of width. Since the rim is floatable laterally relative to the mold, the lateral shifting of one of the tire beads in the rim will cause the rim as a whole to shift laterally in the opposite direction, so that the tire and rim remain centralized relative to the mold. The sides of the tire between the matrix and the rim flanges are prevented from bulging out by the pressure of the air in the bag 13 by reason of the presser rings which are then advanced toward each other somewhat to cause the outer portion of the tread to be pressed firmly against the matrix without however disturbing the firm engagement of the side portions of the tread with the matrix as previously obtained.

While we preferably use the adjustable rim as shown as it can be manipulated to serve various sizes of cross sectional diameters of tire, we may employ instead a number of solid rims as shown at 6—a, the flanges 7—a on which are set a predetermined and greater distance apart than the normal distance between the beads of the tire to be seated therein as shown in Fig. 3.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

A full circle vulcanizing mold for retreading tires comprising matching mold sections to receive the tread portion of the tire, the oppositely disposed inner edges of the mold sections being adapted to extend to approximately the median line of the tire walls, a base for supporting and retaining the beads of the tire such base being adjustable whereby the bead portions of the tire may be adjusted axially of the tire to cause the tread portion to properly fit the mold sections, means to apply pressure against the internal walls of the tire, and independent pressure rings movable axially of the tire to engage the side walls thereof between the base and mold sections and operable to press against such side walls to press the tread firmly against the interior surfaces of the mold sections.

In testimony whereof we affix our signatures.

HERBERT J. WOOCK.
CHARLES J. PETERSON.
JACOB S. CAUFIELD.